May 1, 1951 C. W. KUBON 2,551,270
POTATO CUTTING MACHINE
Filed Sept. 23, 1948 3 Sheets-Sheet 1

INVENTOR.
Clifford W. Kubon
BY Harry D. Kilgore
Attorney

May 1, 1951 — C. W. KUBON — 2,551,270
POTATO CUTTING MACHINE
Filed Sept. 23, 1948 — 3 Sheets-Sheet 2

INVENTOR.
Clifford W. Kubon
BY Harry D. Kilgore
Attorney

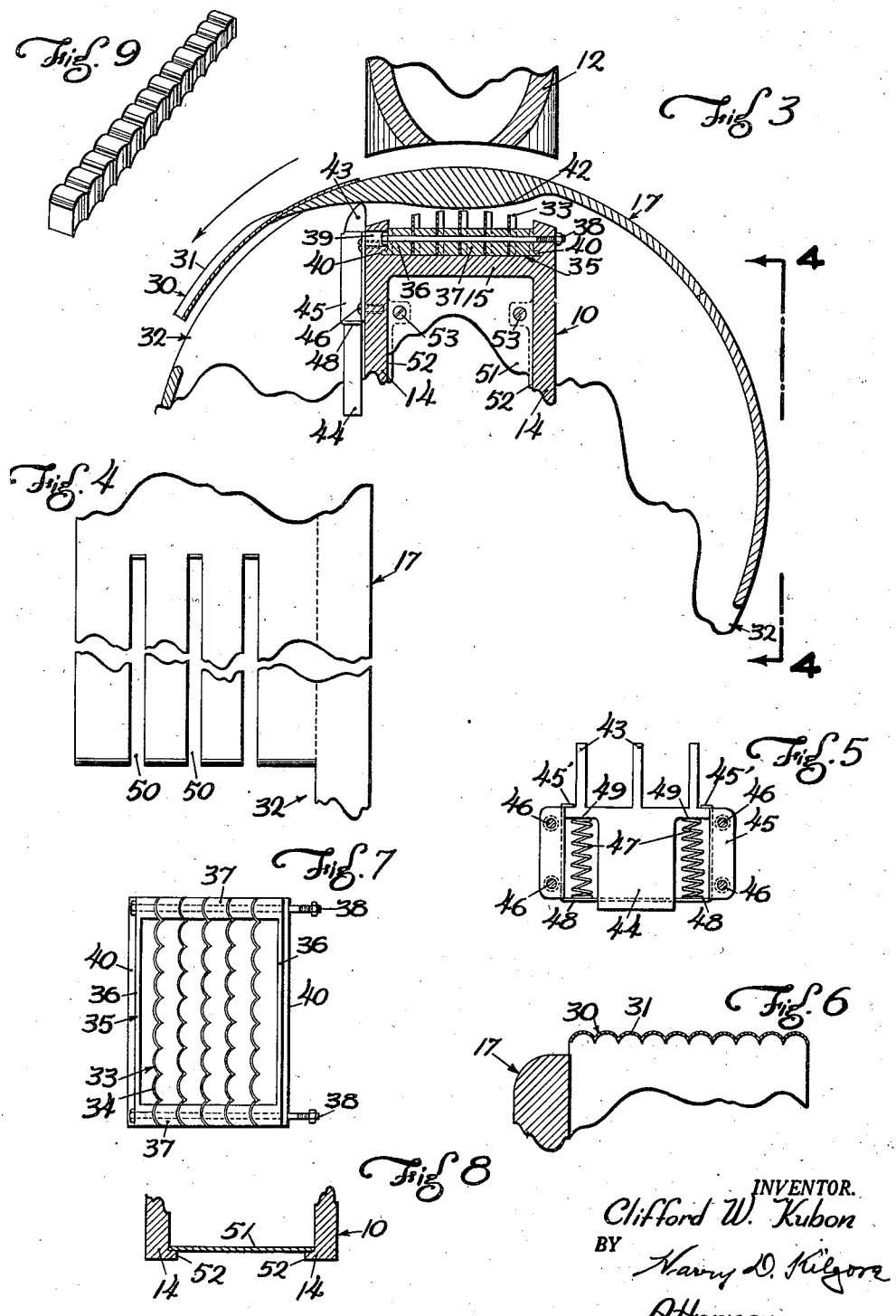

Patented May 1, 1951

2,551,270

UNITED STATES PATENT OFFICE 2,551,270

POTATO CUTTING MACHINE

Clifford W. Kubon, Aitkin, Minn.

Application September 23, 1948, Serial No. 50,681

1 Claim. (Cl. 146—78)

My invention relates to improvements in potato cutting machines.

It is well known that it is a slow and tedious job to cut potatoes by hand into strips for so-called "French fries."

The principal object of this invention is to provide a highly efficient machine for cutting peeled potatoes into strips for "French fries."

Another object of this invention is to cut a potato into strips, all of which are of the same thickness and novel shape.

Other objects of this invention will be apparent from the following description, reference being had to the drawings.

To the above end, generally stated, the invention consists of the novel devices and combination of devices hereinafter described and defined in the claim.

In the accompanying drawings, which illustrate the invention, like characters indicate like parts throughout the several views.

Referring to the drawings:

Fig. 3 is a fragmentary detail view principally in section taken on the line 3—3 of Fig. 2;

Fig. 4 is a fragmentary side view of the drum looking at the same from a position indicated by the line 4—4 of Fig. 3;

Fig. 5 is a rear elevational view of the automatic potato slice holder with its attaching screws sectioned on the line 5—5 of Fig. 1;

Fig. 6 is a fragmentary detail view in section taken on the line 6—6 of Fig. 1;

Fig. 7 is a plan view of the strip-cutting knives and frame removed from the machine;

Fig. 8 is a fragmentary detail view in section taken on the line 8—8 of Fig. 2; and Fig. 9 is a perspective view of the strip as cut from a potato by the machine.

Figure 1:
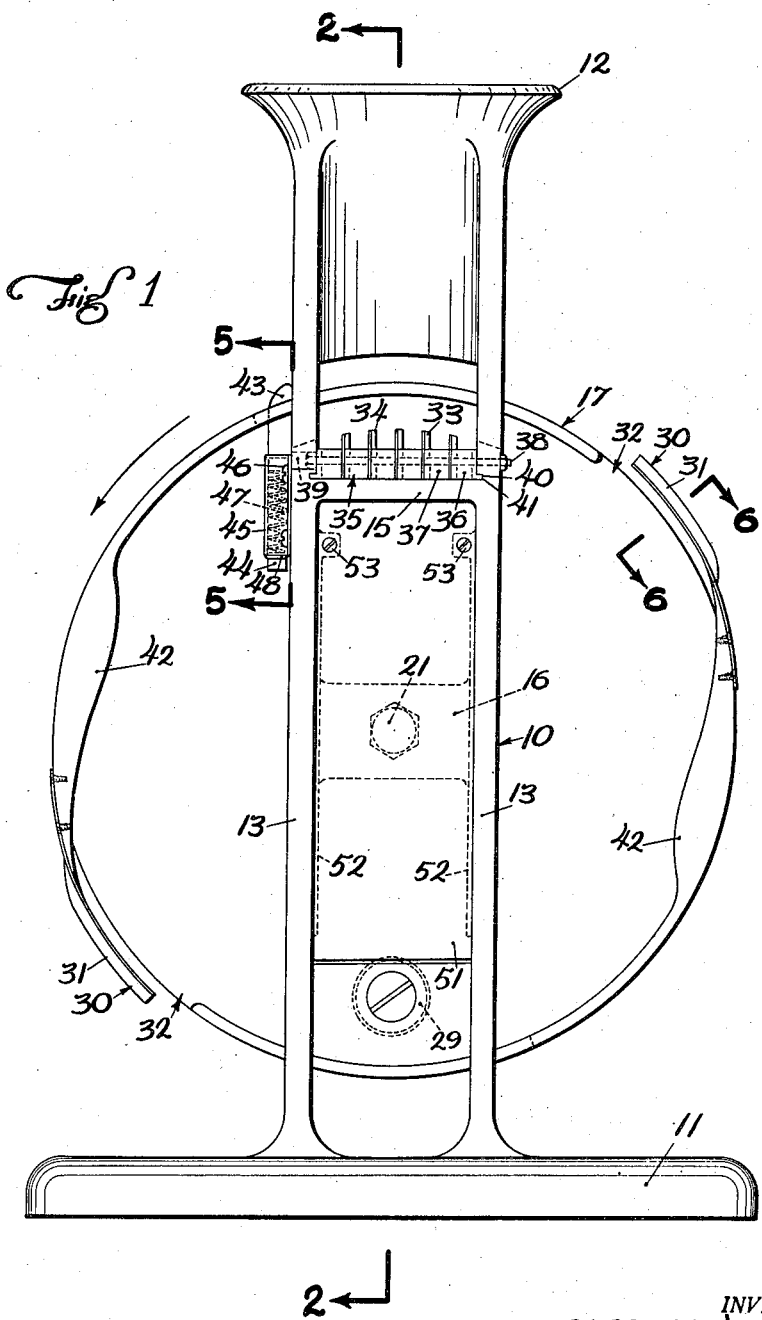
Fig. 1 is a rear elevational view of the improved machine.
Figure 2:
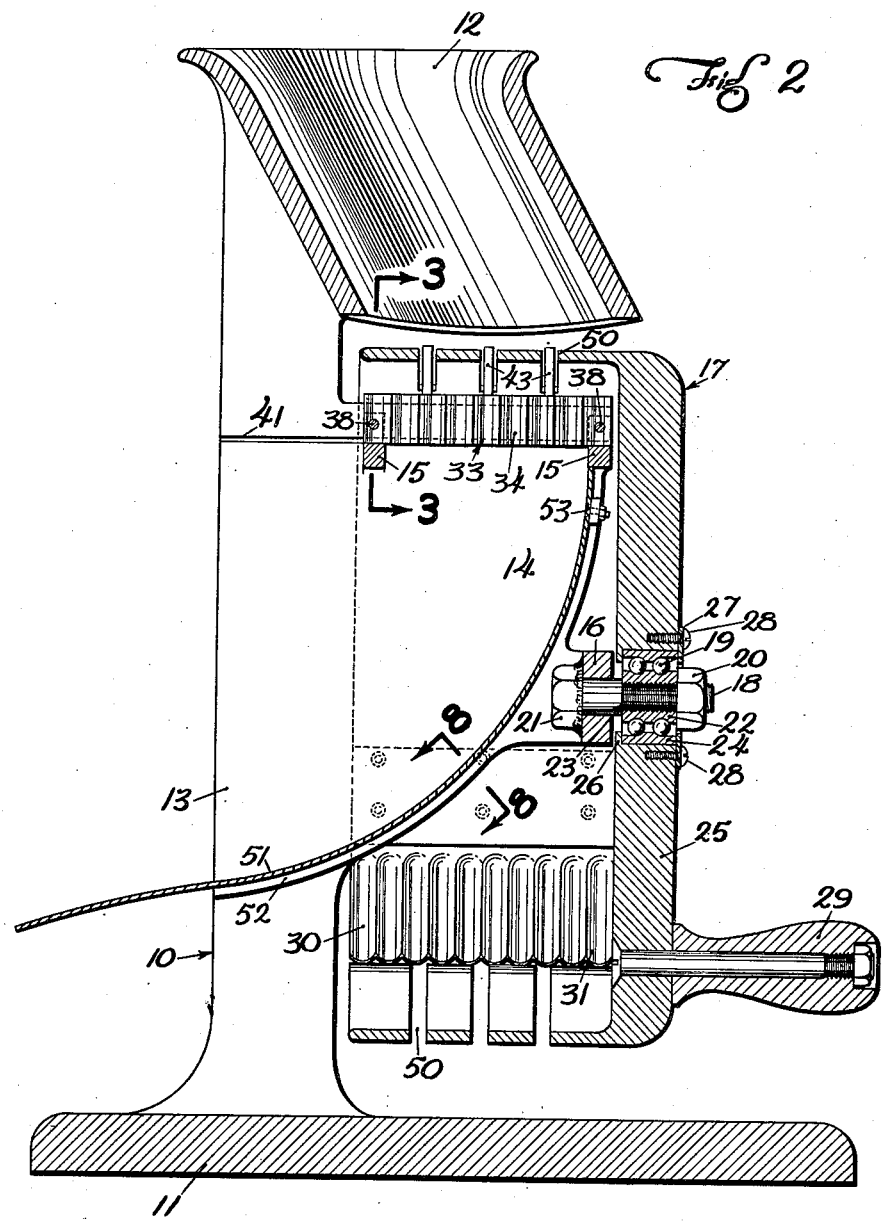
Fig. 2 is a view in central vertical section taken on the line 2—2 of Fig. 1.

The numeral 10 indicates a frame with a heavy supporting base 11 and having on its top an integral hopper 12 whose longitudinal axis is oblique in relation to a vertical plane. This frame 10 includes a pair of laterally spaced flat side members 13 having forwardly projecting intermediate extensions 14. The side members 13 are cross-connected at their upper end portions by a pair of laterally spaced square bars 15 and they are further connected at their front edge portions by a wide cross-tie bar 16 set vertically edgewise.

A drum 17 is mounted on the bar 16 to turn about a horizontal axis by means of a spindle 18 and ball bearing 19. The spindle 18, as shown, is a screw-threaded bolt having a nut 20. This bolt 18 extends through a hole in the bar 16, at its longitudinal center, from the back thereof and its head 21 is rigidly secured to said bar by welding. The inner member 22 of the ball bearing 19 is on the screw-threaded portion of the bolt 18 and is clamped between a shoulder 23 on said bolt and the nut 20. The outer member 24 of the ball bearing 19 is rigidly held in an axial hole in the head 25 of the drum 17, which is on the outer side thereof, between an internal flange 26 on said head and an encircling plate 27 secured to the head 25 by screws 28. The back of the drum 17 is open and houses the frame side extensions 14 and the bars 15 and 16. A handle 29 is bolted to the drum head 25 for turning the drum 17.

On the periphery of the drum 17 and spaced outwardly thereof are two diametrically opposite circumferentially extended slicing knives 30. The spacing of the knives 30 from the drum 17 determines the thickness of a slice to be cut thereby from a potato. Each slicing knife 30 is in the form of a plurality of scallops 31, see Fig. 6. Formed in the periphery of the drum 17, under each slicing knife 30, is a large aperture 32 through which slices of potatoes drop as they are successively cut from a potato in the hopper 12, onto a plurality of laterally spaced horizontal knives 33. Each knife 33 is in the form of a plurality of scallops 34.

The knives 33 are held parallel in assembled relation in a rectangular frame 35 supported on the two cross-tie bars 15. The frame 35 includes a pair of side members 36 and a pair of end members 37, the latter each being made up of sections between which the end portions of the knives 33 extend. A pair of long nut-equipped bolts 38 extend through aligned holes in the side members 36, the sections of the end members 37, the knives 33 and the right-hand frame extension 14, and tightly clamp the same together. The heads of the bolts 38 are in holes 39 in the left-hand frame extension 14 which permit the insertion of the bolts 38 when assembling the several parts of the frame 35 and the knives 33. Tongues 40 on the frame side members 36 slidably extend in grooves 41 in the frame members 13 and their extensions 14.

On the inner wall of the drum 17, behind each slicing knife 30, is a cam 42 that presses a slice of potato onto the knives 33 to cut the same into strips. The heights of the knives 33 are varied so that their cutting edges lie along an arc which conforms to the trajectories of the cams 42, Within the drum 17 is a plurality of upstanding stop pins 43 integral with the plate 44 slidably mounted on the left-hand frame side extension 14 in a keeper 45 secured to said extension by screws 46. Stop flanges 45' on the keeper 45 limit the projecting movement of the plate 44. The plate 44 is yieldingly held to project the stop pins 43 by means of a pair of coiled springs 47. These springs 47 are held compressed between seats 48 on the keeper 45 and shoulders 49 on the plate 44, see Fig. 5. Twice during each rotation of the drum 17, the stop pins 43 are successively projected outwardly of said drum, forwardly of the hopper 12, through two diametrically opposite groups of circumferentially extending parallel slots 50 in the drum 17, to position the same to prevent a slice of potato that has just been cut from a potato in the hopper 12 by the knife 30 from following said slicing knife 30. The rear ends of the slots 50 are open and closely positioned to the front ends of the slicing knives. As the one group of slots 50 move past the projected stop pins 43, the following slicing knife 30 passes over and close to said pins, which strip therefrom the slice of potato that has just been cut thereby. Next, the following cam 42 depresses the projected stop pins 43 and at which time said cam is pressing the slice of potato just cut onto the knives 30 to cut the same into strips. A slice of potato that has dropped through one of the apertures 32 from the overlying slicing knife 30 onto the knives 33 is held from following the cams 42 by the stop pins 43. As one of the cams 42 moves past the stop pins 43, said pins are projected against the inner wall of the drum 17 and held retracted thereby until they are projected through the slots 50 in the next following group.

The strips cut from a slice of potato will remain between the knives 30, due to suction, until the next following slice is cut into slices which presses the underlying strips from between said knives and precipitates the same onto an underlying chute 51 in the drum 17. This chute 51 is a curved sheet of metal that extends from the foremost cross-tie bar 15 downwardly and rearwardly through the open back of the drum 17. The chute 51 is supported on opposing flanges 52 on the frame side member 13 and their extensions 14 and secured thereto by machine screws 53. Strips of potatoes precipitated onto the chute 51 slide thereon outwardly of the drum 17 and rearwardly of the frame 10. A receptacle, not shown, may be placed at the delivery end of the chute 51 to receive the potato strips discharged therefrom.

A potato in the hopper 12 being cut into slices may be fed to the slicing knives 30 by a second potato pressed thereon and the last potato to be cut may be fed to said knife by a stick.

The hopper 12 is vertically oblique to the plane of the slicing knife 30 when passing under said hopper, whereby a potato in the hopper will be presented to the slicing knife 30 in a manner in which maximum uniformity may be obtained in the length of the potato strips cut by the slicing knife 30.

By reference to the potato strip shown in Fig. 9, it will be noted that the scallops in slicing knife 30 and the horizontal knives 33 cut said strip so that opposite sides thereof are concavo-convex. These concavo-convex surfaces of a potato strip present a greater portion of the potato strip to the hot fat in which it is being cooked and hence the potato strips are more thoroughly cooked and, in addition, given a novel appearance.

From what has been said, it will be understood that the potato cutter described is capable of modifications as to details of construction and arrangement within the scope of the invention herein disclosed and claimed.

What I claim is:

In a machine of the class described, a frame, a rotatable drum having an annular body mounted on the frame to turn about a horizontal axis, a long slicing knife extending circumferentially and axially of the drum and secured thereto at its rear end, said knife being spaced outwardly of said body concentric therewith, an aperture in said body under the slicing knife, an open bottom hopper on the frame constructed and arranged to hold a potato on said body to be sliced by said knife, a plurality of horizontal and laterally spaced fixed knives in the drum on which a slice cut by the slicing knife from a potato in the hopper is deposited, the cutting edges of the fixed knives being concentric to said body, a cam on the inner side of the body leading rearwardly from the underside of the slicing knife and having a bulge that passes over the fixed knives during rotation of the drum with a working clearance to press a slice of potato onto the fixed knives to cut the same into strips, a plurality of laterally spaced circumferential slots in the body of the drum, the rear end of which are open and lead into the aperture under the fixed knife, a plurality of stop pins in the drum aligned with the slots, and spring means yieldingly holding the stop pins pressed endwise against the inner side of said body to be projected through the slots during rotation of the drum, and their outer ends closely positioned to the under side of the slicing knife, thereafter, said stop pins being retracted by the cam during continued rotation of the drum.

CLIFFORD W. KUBON.

REFERENCES CITED

The following references are of record in the file of this patent:

UNITED STATES PATENTS

| Number | Name | Date |
|---|---|---|
| 76,912 | Heberling | Apr. 21, 1868 |
| 1,395,425 | Kennedy | Nov. 1, 1921 |
| 2,049,125 | Livingston | July 28, 1936 |
| 2,088,298 | Love | July 27, 1937 |
| 2,187,957 | Urschel | Jan. 23, 1940 |

FOREIGN PATENTS

| Number | Country | Date |
|---|---|---|
| 774,332 | Australia | June 8, 1933 |
| 333,677 | Germany | Mar. 2, 1921 |